(12) United States Patent
Salter et al.

(10) Patent No.: US 9,809,160 B2
(45) Date of Patent: *Nov. 7, 2017

(54) TAILGATE ILLUMINATION SYSTEM (71) Applicant: Ford Global Technologies, LLC, Dearborn, MI (US)

(72) Inventors: Stuart C. Salter, White Lake, MI (US); Paul Kenneth Dellock, Northville, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 214 days.

This patent is subject to a terminal disclaimer.

(21) Appl. No.: 14/687,972

(22) Filed: Apr. 16, 2015

(65) Prior Publication Data
US 2015/0217685 A1    Aug. 6, 2015

Related U.S. Application Data (63) Continuation-in-part of application No. 14/603,636, filed on Jan. 23, 2015, now Pat. No. 9,573,517, which
(Continued)

(51) Int. Cl.
*B60Q 1/56* (2006.01)
*H05B 37/02* (2006.01)
(Continued)

(52) U.S. Cl.
CPC ............... *B60Q 1/56* (2013.01); *B60Q 3/30* (2017.02); *H05B 37/0218* (2013.01);
(Continued)

(58) Field of Classification Search
CPC ... B60Q 3/30; B60Q 3/40; B60Q 3/06; B60Q 3/0216; B60Q 1/323; B60Q 1/24; B60Q 1/56
See application file for complete search history.

(56) References Cited

U.S. PATENT DOCUMENTS 2,486,859 A    11/1949  Meijer et al.
4,745,525 A *   5/1988  Sheehy ............... B60Q 1/0011
                                                340/479
(Continued)

FOREIGN PATENT DOCUMENTS

CN      201169230 Y      12/2008
CN      101337492 A       1/2009
(Continued)

OTHER PUBLICATIONS

Anthony, Lim, "Lexus IS 250 updated again in Malaysia for 2011," Paultan.org, Nov. 29, 2010, last accessed Mar. 26, 2013, 3 pages.
(Continued)

*Primary Examiner* — Robert May
(74) *Attorney, Agent, or Firm* — Jason Rogers; Price Heneveld LLP (57) ABSTRACT

An illumination system for a vehicle includes a truck bed defining a cargo space, a bumper positioned vehicle rearward of the truck bed, and a tailgate defining a recessed surface and rotatable between substantially open and substantially closed positions. A first optically interactive portion is positioned on the truck bed and a second optically interactive portion is positioned on the tailgate. A light source is positioned on the recessed surface of the tailgate. The light source and the first and second optically interactive surfaces are configured to illuminate the cargo space when the tailgate is in the substantially open position and illuminate the bumper when the tailgate is in the substantially closed position.

19 Claims, 7 Drawing Sheets

US 9,809,160 B2

Page 2

Related U.S. Application Data is a continuation-in-part of application No. 14/086,442, filed on Nov. 21, 2013.

(51) Int. Cl.
*B60Q 3/30* (2017.01)
*B60Q 1/24* (2006.01)
*F21Y 115/10* (2016.01)

(52) U.S. Cl.
CPC .......... *H05B 37/0227* (2013.01); *B60Q 1/24* (2013.01); *B60Q 2400/20* (2013.01); *F21Y 2115/10* (2016.08); *Y02B 20/46* (2013.01)

(56) References Cited

U.S. PATENT DOCUMENTS

| | | | |
|---|---|---|---|
| 5,053,930 A | 10/1991 | Benavides | |
| 5,709,453 A | 1/1998 | Krent et al. | |
| 5,795,051 A * | 8/1998 | Galanski | B60Q 1/30 |
| | | | 362/154 |
| 5,839,718 A | 11/1998 | Hase et al. | |
| 6,031,511 A | 2/2000 | DeLuca et al. | |
| 6,117,362 A | 9/2000 | Yen et al. | |
| 6,416,106 B2 | 7/2002 | Ponziani | |
| 6,419,854 B1 | 7/2002 | Yocom et al. | |
| 6,494,490 B1 | 12/2002 | Trantoul | |
| 6,502,885 B1 * | 1/2003 | Gammon | B60N 3/08 |
| | | | 224/401 |
| 6,577,073 B2 | 6/2003 | Shimizu et al. | |
| 6,729,738 B2 | 5/2004 | Fuwausa et al. | |
| 6,737,964 B2 | 5/2004 | Samman et al. | |
| 6,773,129 B2 | 8/2004 | Anderson, Jr. et al. | |
| 6,786,623 B2 * | 9/2004 | Snyder | B60Q 3/06 |
| | | | 362/485 |
| 6,820,888 B1 | 11/2004 | Griffin | |
| 6,851,840 B2 | 2/2005 | Ramamurthy et al. | |
| 6,859,148 B2 | 2/2005 | Miller | |
| 6,871,986 B2 | 3/2005 | Yamanaka et al. | |
| 6,953,536 B2 | 10/2005 | Yen et al. | |
| 6,990,922 B2 | 1/2006 | Ichikawa et al. | |
| 7,015,893 B2 | 3/2006 | Li et al. | |
| 7,161,472 B2 | 1/2007 | Strumolo et al. | |
| 7,182,380 B2 | 2/2007 | Nagle | |
| 7,213,923 B2 | 5/2007 | Liu et al. | |
| 7,216,997 B2 | 5/2007 | Anderson, Jr. | |
| 7,264,366 B2 | 9/2007 | Hulse | |
| 7,264,367 B2 | 9/2007 | Hulse | |
| 7,441,914 B2 | 10/2008 | Palmer et al. | |
| 7,501,749 B2 | 3/2009 | Takeda et al. | |
| 7,575,349 B2 | 8/2009 | Bucher et al. | |
| 7,635,212 B2 | 12/2009 | Seidler | |
| 7,745,818 B2 | 6/2010 | Sofue et al. | |
| 7,753,541 B2 | 7/2010 | Chen et al. | |
| 7,834,548 B2 | 11/2010 | Jousse et al. | |
| 7,834,750 B1 * | 11/2010 | Hertz | B60Q 1/2692 |
| | | | 340/468 |
| 7,862,220 B2 | 1/2011 | Cannon et al. | |
| 7,987,030 B2 | 7/2011 | Flores et al. | |
| 8,016,465 B2 | 9/2011 | Egerer et al. | |
| 8,022,818 B2 | 9/2011 | la Tendresse et al. | |
| 8,044,415 B2 | 10/2011 | Messere et al. | |
| 8,066,416 B2 | 11/2011 | Bucher | |
| 8,071,988 B2 | 12/2011 | Lee et al. | |
| 8,097,843 B2 | 1/2012 | Agrawal et al. | |
| 8,120,236 B2 | 2/2012 | Auday et al. | |
| 8,136,425 B2 | 3/2012 | Bostick | |
| 8,163,201 B2 | 4/2012 | Agrawal et al. | |
| 8,178,852 B2 | 5/2012 | Kingsley et al. | |
| 8,197,105 B2 | 6/2012 | Yang | |
| 8,203,260 B2 | 6/2012 | Li et al. | |
| 8,207,511 B2 | 6/2012 | Bortz et al. | |
| 8,232,533 B2 | 7/2012 | Kingsley et al. | |
| 8,247,761 B1 | 8/2012 | Agrawal et al. | |
| 8,286,378 B2 | 10/2012 | Martin et al. | |
| 8,408,766 B2 | 4/2013 | Wilson et al. | |
| 8,415,642 B2 | 4/2013 | Kingsley et al. | |
| 8,421,811 B2 | 4/2013 | Odland et al. | |
| 8,466,438 B2 | 6/2013 | Lambert et al. | |
| 8,519,359 B2 | 8/2013 | Kingsley et al. | |
| 8,519,362 B2 | 8/2013 | Labrot et al. | |
| 8,552,848 B2 | 10/2013 | Rao et al. | |
| 8,606,430 B2 | 12/2013 | Seder et al. | |
| 8,624,716 B2 | 1/2014 | Englander | |
| 8,631,598 B2 | 1/2014 | Li et al. | |
| 8,664,624 B2 | 3/2014 | Kingsley et al. | |
| 8,683,722 B1 | 4/2014 | Cowan | |
| 8,724,054 B2 | 5/2014 | Jones | |
| 8,754,426 B2 | 6/2014 | Marx et al. | |
| 8,773,012 B2 | 7/2014 | Ryu et al. | |
| 8,846,184 B2 | 9/2014 | Agrawal et al. | |
| 8,851,694 B2 | 10/2014 | Harada | |
| 8,876,352 B2 | 11/2014 | Robbins et al. | |
| 8,952,341 B2 | 2/2015 | Kingsley et al. | |
| 9,006,751 B2 | 4/2015 | Kleo et al. | |
| 9,018,833 B2 | 4/2015 | Lowenthal et al. | |
| 9,057,021 B2 | 6/2015 | Kingsley et al. | |
| 9,065,447 B2 | 6/2015 | Buttolo et al. | |
| 9,187,034 B2 | 11/2015 | Tarahomi et al. | |
| 9,299,887 B2 | 3/2016 | Lowenthal et al. | |
| 2002/0159741 A1 | 10/2002 | Graves et al. | |
| 2002/0163792 A1 | 11/2002 | Formoso | |
| 2003/0167668 A1 | 9/2003 | Fuks et al. | |
| 2003/0179548 A1 | 9/2003 | Becker et al. | |
| 2003/0230909 A1 * | 12/2003 | Melius | B60J 7/067 |
| | | | 296/98 |
| 2004/0213088 A1 | 10/2004 | Fuwausa | |
| 2005/0146888 A1 * | 7/2005 | Metcalf | B60Q 1/305 |
| | | | 362/541 |
| 2005/0190570 A1 | 9/2005 | Roessler | |
| 2006/0087826 A1 | 4/2006 | Anderson et al. | |
| 2006/0097121 A1 | 5/2006 | Fugate | |
| 2007/0032319 A1 | 2/2007 | Tufte | |
| 2007/0285938 A1 | 12/2007 | Palmer et al. | |
| 2007/0297045 A1 | 12/2007 | Sakai et al. | |
| 2009/0219730 A1 | 9/2009 | Syfert et al. | |
| 2009/0251920 A1 | 10/2009 | Kino et al. | |
| 2009/0260562 A1 | 10/2009 | Folstad et al. | |
| 2009/0262515 A1 | 10/2009 | Lee et al. | |
| 2011/0012062 A1 | 1/2011 | Agrawal et al. | |
| 2012/0001406 A1 | 1/2012 | Paxton et al. | |
| 2012/0104954 A1 | 5/2012 | Huang | |
| 2012/0183677 A1 | 7/2012 | Agrawal et al. | |
| 2012/0280528 A1 | 11/2012 | Dellock et al. | |
| 2013/0092965 A1 | 4/2013 | Kijima et al. | |
| 2013/0335994 A1 | 12/2013 | Mulder et al. | |
| 2014/0029281 A1 | 1/2014 | Suckling et al. | |
| 2014/0065442 A1 | 3/2014 | Kingsley et al. | |
| 2014/0103258 A1 | 4/2014 | Agrawal et al. | |
| 2014/0211498 A1 | 7/2014 | Cannon et al. | |
| 2014/0264396 A1 | 9/2014 | Lowenthal et al. | |
| 2014/0266666 A1 | 9/2014 | Habibi | |
| 2014/0373898 A1 | 12/2014 | Rogers et al. | |
| 2015/0046027 A1 | 2/2015 | Sura et al. | |
| 2015/0109602 A1 | 4/2015 | Martin et al. | |
| 2015/0138789 A1 | 5/2015 | Singer et al. | |
| 2015/0267881 A1 | 9/2015 | Salter et al. | |
| 2016/0016506 A1 | 1/2016 | Collins et al. | |
| 2016/0236613 A1 | 8/2016 | Trier | |

FOREIGN PATENT DOCUMENTS

| | | |
|---|---|---|
| CN | 201193011 Y | 2/2009 |
| CN | 203601175 U | 5/2014 |
| CN | 204127823 U | 1/2015 |
| DE | 4120677 A1 | 1/1992 |
| DE | 29708699 U1 | 7/1997 |
| DE | 10319396 A1 | 11/2004 |
| DE | 102004031796 A1 | 1/2006 |
| DE | 102004051315 A1 | 4/2006 |
| DE | 102005017448 A1 | 10/2006 |
| DE | 102011015012 A1 | 9/2012 |
| DE | 102011016416 A1 | 10/2012 |
| EP | 1031462 A2 | 8/2000 |
| EP | 1793261 A1 | 6/2007 |

(56) References Cited

FOREIGN PATENT DOCUMENTS

| EP | 2778209 A1 | 9/2014 |
|----|------------|--------|
| IN | 201003235 | 10/2010 |
| JP | 2000159011 A | 6/2000 |
| JP | 2007238063 A | 9/2007 |
| JP | 2009006853 A | 1/2009 |
| KR | 20060026531 A | 3/2006 |
| WO | 2006047306 A1 | 5/2006 |
| WO | 2014056607 A1 | 4/2014 |
| WO | 2014068440 A1 | 5/2014 |

OTHER PUBLICATIONS

Mechanics Warehouse, "Plasmaglow 60 inch FireStorm LED Light Bar," www.mechanics-warehouse.com/plasmaglow-led.htm, last accessed Dec. 25, 2014, 2 pages.

\* cited by examiner

TAILGATE ILLUMINATION SYSTEM

CROSS-REFERENCE TO RELATED APPLICATIONS

This application is a continuation-in-part of U.S. patent application Ser. No. 14/603,636, filed on Jan. 23, 2015, entitled "DOOR ILLUMINATION AND WARNING SYSTEM," now U.S. Pat. No. 9,573,517, which is a continuation-in-part of U.S. patent application Ser. No. 14/086,442 filed on Nov. 21, 2013, entitled "VEHICLE LIGHTING SYSTEM WITH PHOTOLUMINESCENT STRUCTURE. The aforementioned related applications are hereby incorporated by reference in their entirety.

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from photoluminescent materials offers a unique and attractive viewing experience. It is therefore desired to incorporate such photoluminescent materials in portions of vehicles to provide accent lighting.

SUMMARY OF THE INVENTION

According to one aspect of the present invention, an illumination system for a vehicle having a truck bed defining a cargo space, a bumper positioned vehicle rearward of the truck bed, a tailgate defining a recessed surface rotatable between substantially open and substantially closed positions includes of a first optically interactive portion positioned on the truck bed and a second optically interactive portion positioned on the tailgate. A light source is positioned on the recessed surface of the tailgate. The light source and the first and second optically interactive surfaces are configured to illuminate the cargo space when the tailgate is in the substantially open position and illuminate downward when the tailgate is in the substantially closed position.

According to another aspect of the present invention, a vehicle includes a truck bed defining a cargo space, a bumper positioned vehicle rearward of the truck bed, a tailgate operable between a substantially open position and a substantially closed position, and an illumination system. The illumination system includes a light source which illuminates downward when the tailgate is in the closed position and illuminates the cargo space when the tailgate is in the open position.

According to yet another aspect of the present invention, a vehicle includes a truck bed with an optically interactive portion positioned thereon, a bumper positioned vehicle rearward of the truck bed and defining a license plate area, a trailer hitch mounted below the bumper, and a light source positioned on a tailgate. The optically interactive portion and light source are configured to cooperatively illuminate the license plate area of the bumper and the trailer hitch.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
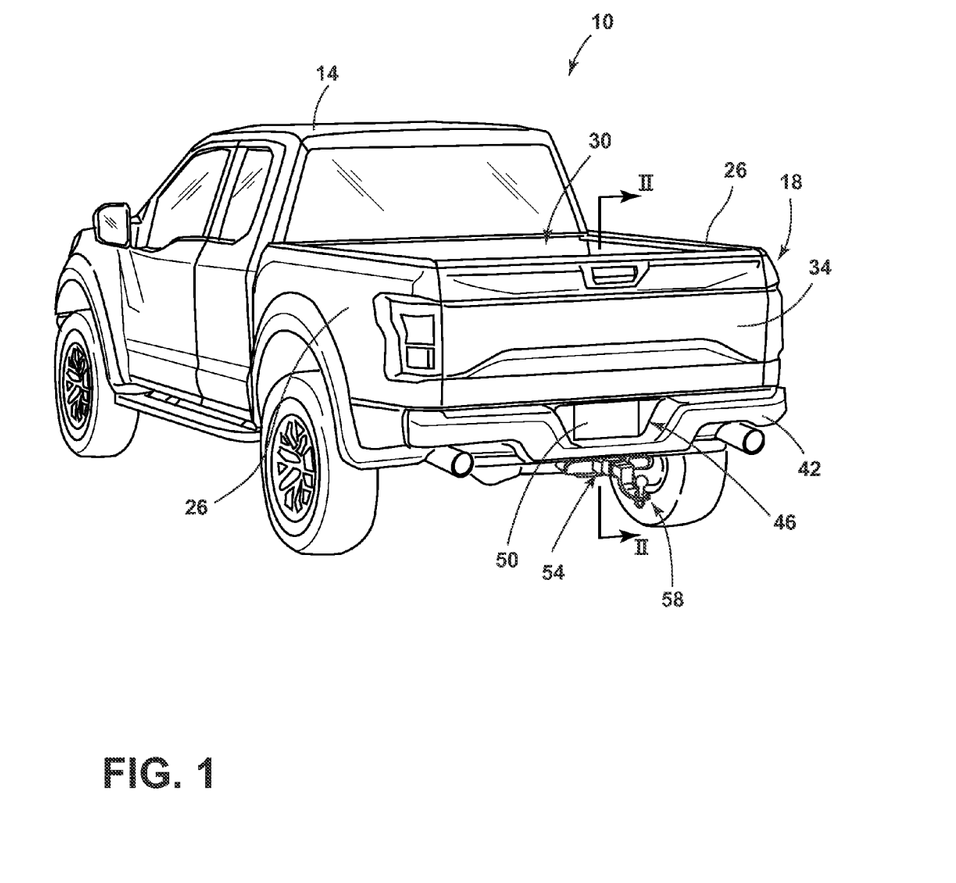
FIG. 1 illustrates a rear perspective view of a vehicle according to one embodiment.
Figure 2A:
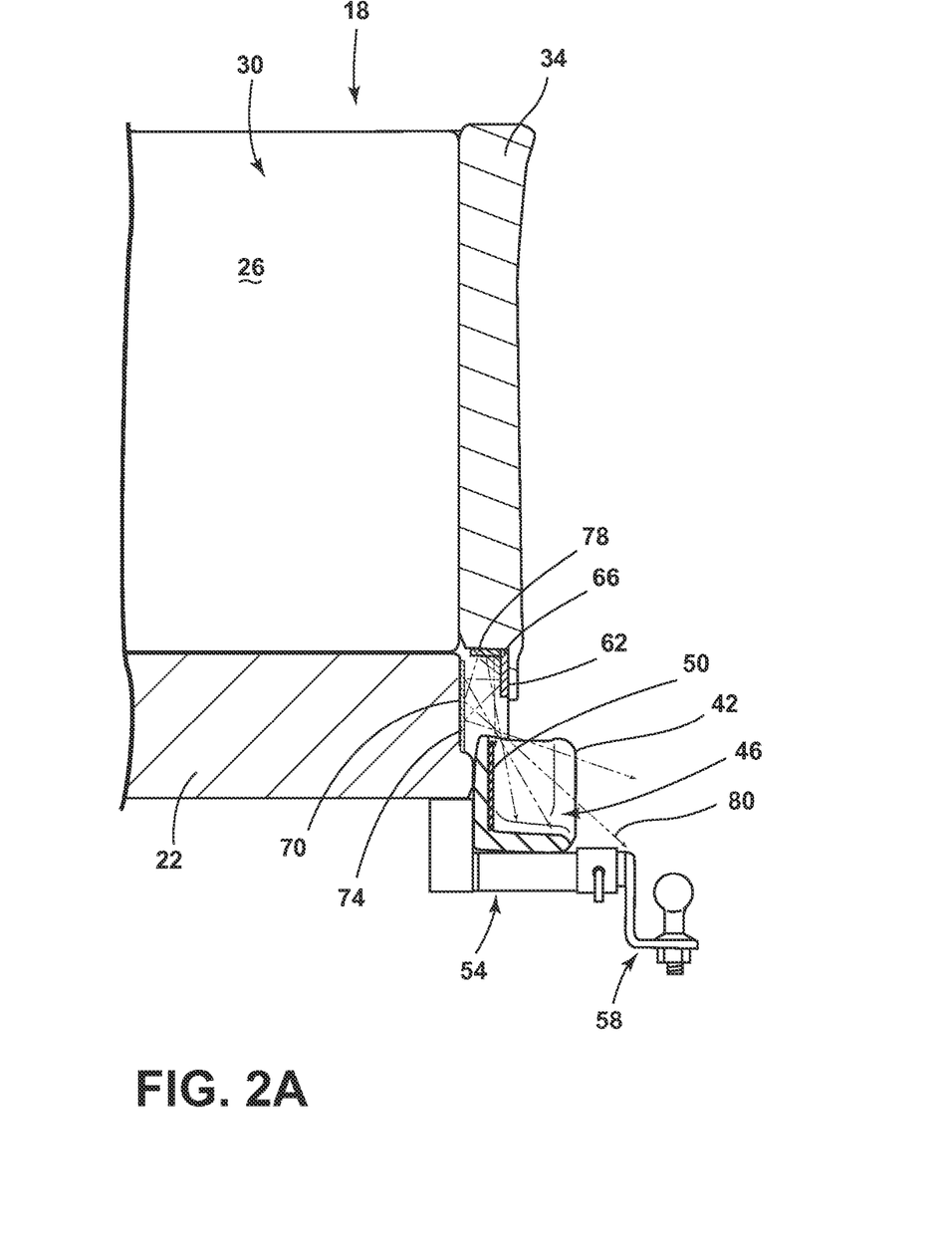
FIG. 2A is a cross sectional view taken along line II-II of FIG. 1 according to one embodiment.
Figure 2B:
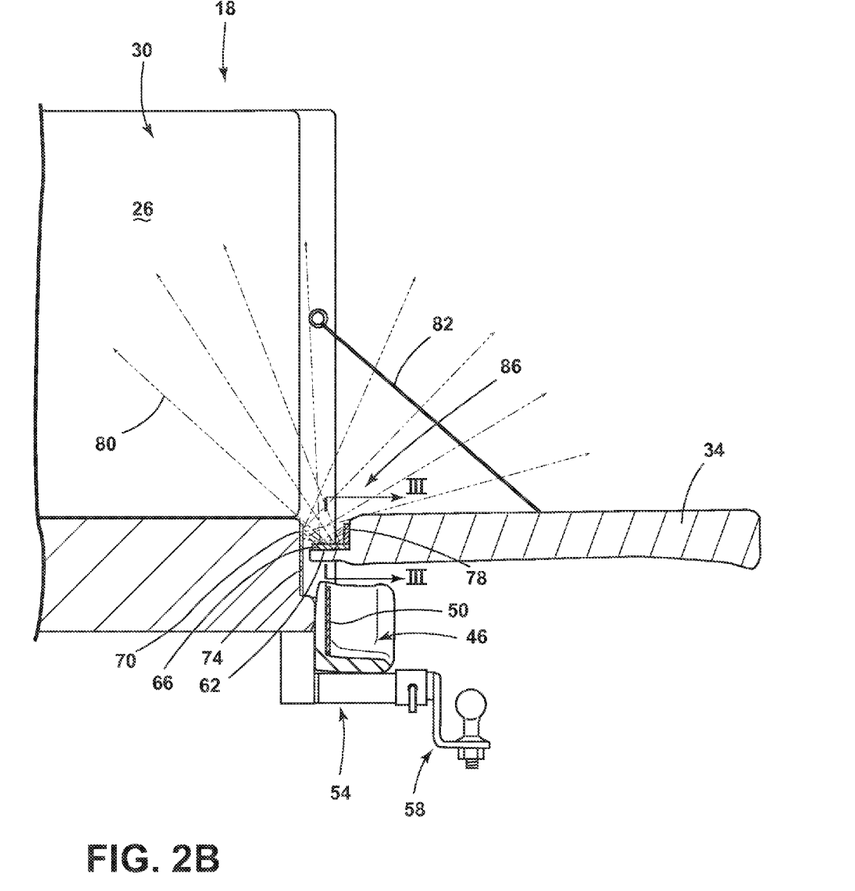
FIG. 2B is a cross sectional view taken along line II-II of FIG. 1 according to a further embodiment.

Referring to FIGS. 1-2B, depicted is a vehicle 10 in the form of a pick-up truck having a cab 14 and a truck bed 18. The truck bed 18 includes a substantially horizontal floor 22 and a pair of substantially vertical side walls 26. Coupled to a rear portion of the truck bed 18 is a pivotable tailgate 34. The tailgate 34 is operable to pivot between substantially closed (FIG. 2A) and substantially open (FIG. 2B) positions. Opening of the tailgate 34 to the open position permits access to a cargo space 30 defined by the truck bed 18 of the vehicle 10. Coupled to a rear of the vehicle 10 is a bumper 42 defining a license plate area 46. A license plate 50 may be mounted to the license plate area 46 and illuminated in order to comply with local, state, and federal transportation laws. In the depicted embodiment, a trailer hitch receiver 54 is coupled with a trailer hitch 58 and is positioned under the license plate area 46 of the bumper 42 and may be utilized in towing a trailer or other towed equipment.

Referring now to the embodiments depicted in FIGS. 2A and 2B, a recessed surface 62 is defined along a bottom portion of the tailgate 34 on which a light source 66 is positioned. The tailgate 34 extends over the bumper 42 and license plate area 46. Although depicted as facing a vehicle forward direction, the light source 66 may also directly face the bumper 42 and license plate area 46. The floor 22 of the truck bed 18 defines a rear surface 70 along which a first optically interactive portion 74 is positioned. The first optically interactive portion 74 may be positioned across a width of the rear surface 70 of the floor 22, or may be discontinuously placed on the rear surface 70. For example, the first optically interactive portion 74 may be located only proximate the license plate area 46 of the bumper 42. Additionally, the first optically interactive portion 74 may extend the height of the rear surface 70, or may be disposed over only a portion of the rear surface 70. A second optically interactive portion 78 is depicted as proximate to the light source 66 and the recessed surface 62. In one embodiment, the first and/or second optically active portions 74, 78 are reflective elements that may include a metal, a polymeric material that has been metalized or otherwise configured to substantially reflect light, or other known reflective materials. For example, the first and second optically interactive portions 74, 78 may include materials configured to reflect greater than about 50%, greater than about 60%, greater than about 70%, greater than about 80%, and greater than about 90% of light in either a diffuse or specular manner. In one embodiment, the first and second optically interactive portions 74, 78 are simply light colored strips configured to reflect light. In additional embodiments, the first and second optically interactive portions 74, 78 may include one or more photoluminescent materials or structures capable of producing a light emission, as explained in greater detail below. The first and second optically interactive portions 74, 78 may also include combinations of photoluminescent materials/structures and reflective elements.

Referring now to FIG. 2A, in operation, the light source 66 is configured to emit light 80. The emitted light 80 may be in the visible spectrum and/or the non-visible spectrum. The light source 66 is positioned on the tailgate 34 such that when the tailgate 34 is in the substantially closed position as seen in FIG. 2A, the light source 66 cooperates with the first and second optically interactive portions 74, 78 to direct the emitted light 80 in a downward and vehicle rearward direction such that the bumper 42, license plate 50, the license plate area 46, the trailer hitch 58 and/or the ground behind and below the vehicle 10 are illuminated. In ground illumination embodiments, the emitted light 80 may function as a puddle lamp behind the vehicle 10 to provide illumination to ground hazards (e.g., uneven terrain, water, and/or holes) and/or general task lighting near the ground. It should be understood that the positions of the light source 66, and the first and second optically interactive portions 74, 78 may be swapped (i.e., positions changed) in order to provide different lighting effects to the license plate 50, the license plate area 46, the trailer hitch 58, and/or the ground. For example, the light source 66 may be moved to the position of the second optically interactive portion 78 to provide a more direct illumination of the license plate area 46. In another embodiment, the light source 66 may be moved to the rear surface 70 of the truck bed 18 floor 22 in order to provide a more direct lighting of the trailer hitch 58. Additionally, the light 80 may be used for general task lighting proximate the rear of the vehicle 10 or in some cases, auxiliary reverse lights and/or brake lights. It should be noted that the light source 66 may effectively illuminate the license plate 50, license plate area 46, and trailer hitch 58 with the use of one (e.g., either of the optically interactive portions 74, 78), neither, or more than two optically interactive portions.

Referring now to FIG. 2B, the tailgate 34 is depicted in the substantially open position. The tailgate 34 pivots about a pair of pivot pins on a pivot axis at or near the lower edge relative to the closed position. A tailgate cable 82 may assist is supporting the tailgate 34 while the tailgate 34 is in the substantially open position. As the tailgate 34 rotates from the substantially closed position to the substantially open position, the light source 66 rotates from an approximately vertical orientation (FIG. 2A) to an approximately horizontal orientation (FIG. 2B). Similarly to the light source 66, the second optically interactive portion 78 rotates from an approximately horizontal orientation (FIG. 2A) to an approximately vertical orientation (FIG. 2B). Accordingly, by rotating the tailgate 34 into the substantially horizontal open position, the light source 66 is positioned to emit light 80 vertically into the cargo space 30 and over the inside or top surface of the tailgate 34. The positioning of the light source 66 between the first and second optically interactive portions 74, 78 permits a wide angle at which the emitted light 80 may be viewed, thus providing task lighting of both the cargo space 30 and a space above the tailgate 34 for performing tasks (e.g., securing tie downs, positioning a tarp, loading objects to be hauled by the vehicle 10). As the tailgate 34 is rotated into the substantially horizontal open position, a gap 86 may be formed between the tailgate 34 and the floor 22 of the truck bed 18. The gap 86, under certain lighting conditions, may present a hazard to occupants and objects located in the cargo space 30 of the truck bed 18 as it creates a discontinuity in the height of the truck bed 18. Advantageously, the emitted light 80 may serve as a warning to occupants located within the cargo space 30 and on the tailgate 34 of the location of the gap 86.

Figure 3A:
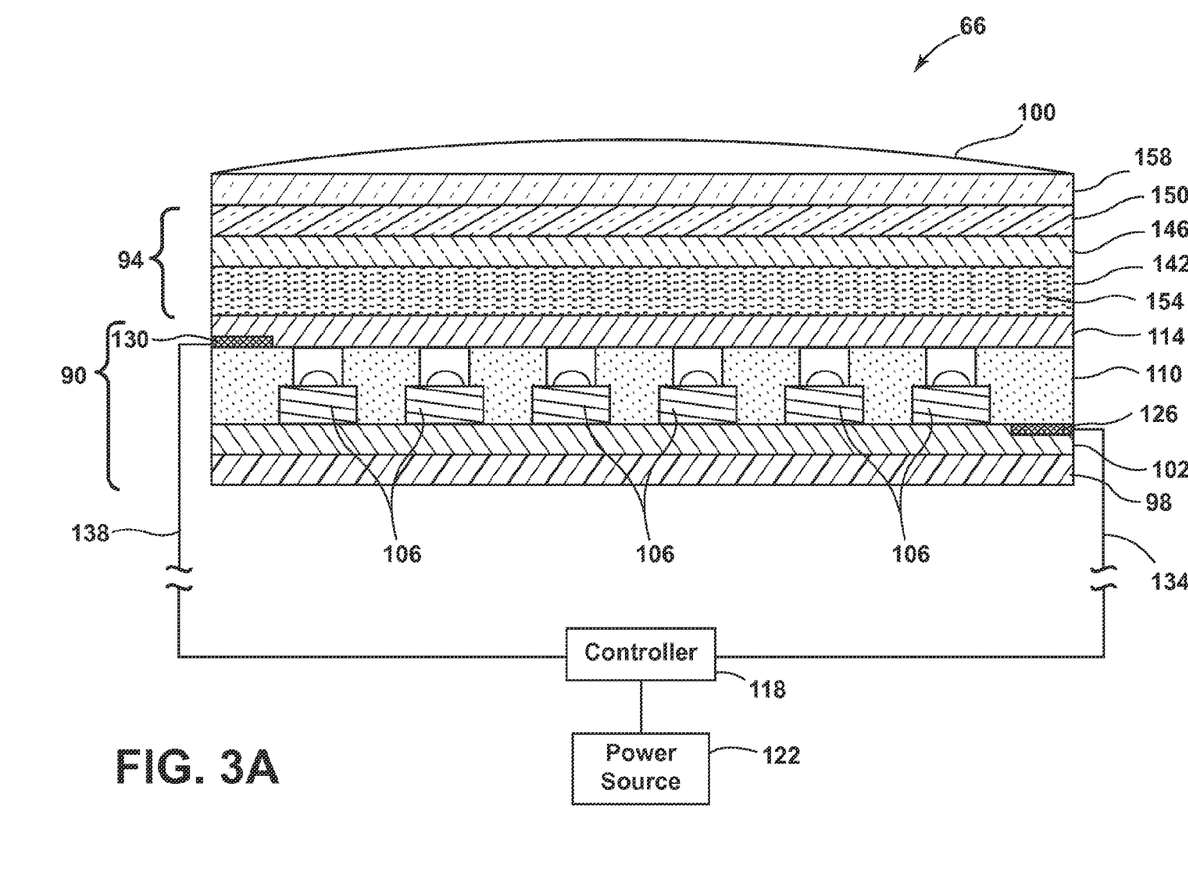
FIG. 3A is a cross-sectional view taken along line III-III of FIG. 2B illustrating a light source according to one embodiment.
Figure 3B:
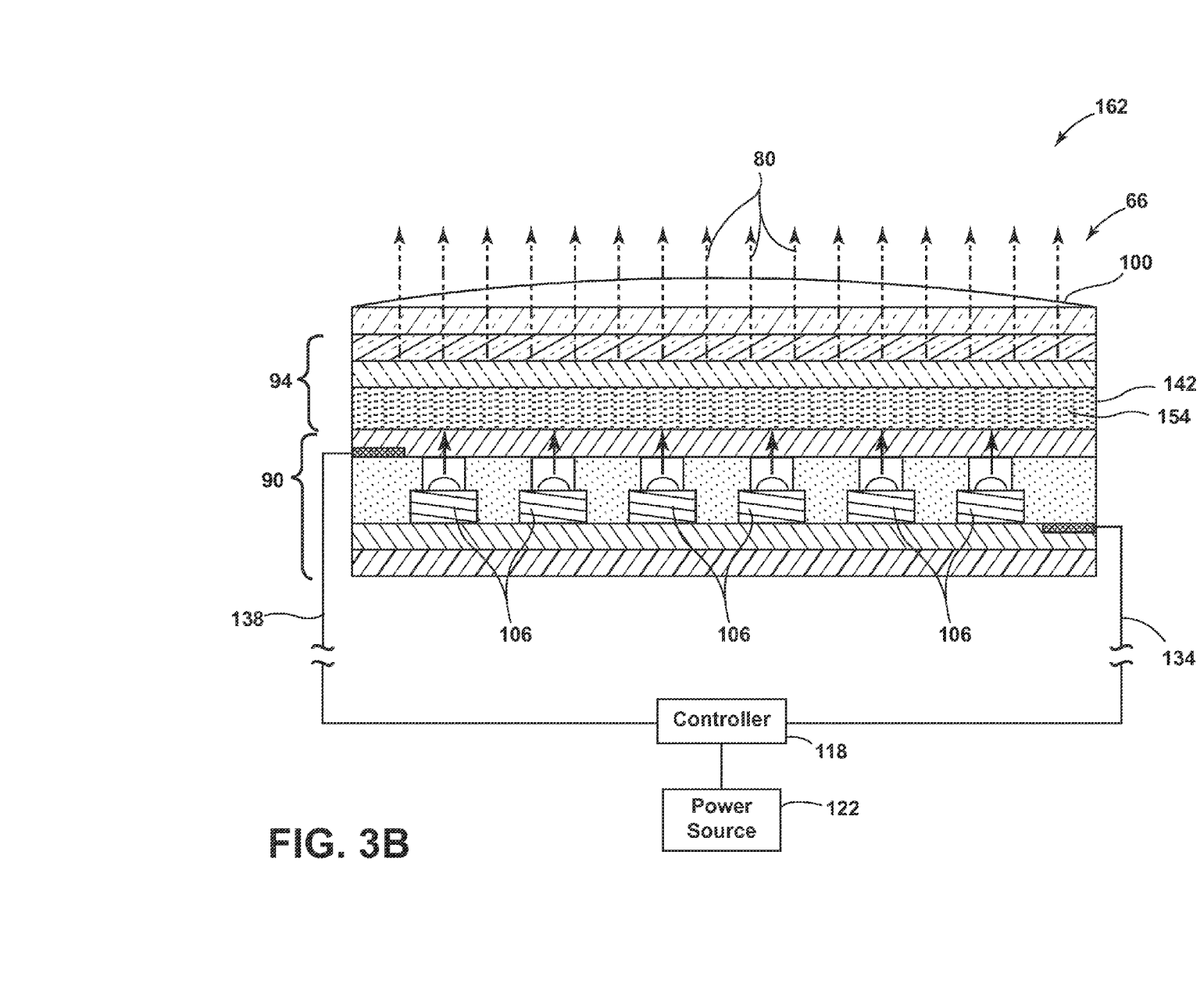
FIG. 3B is a cross-sectional view taken along line III-III of FIG. 2B further illustrating an energy conversion process for generating a single color, according to one embodiment.
Figure 3C:
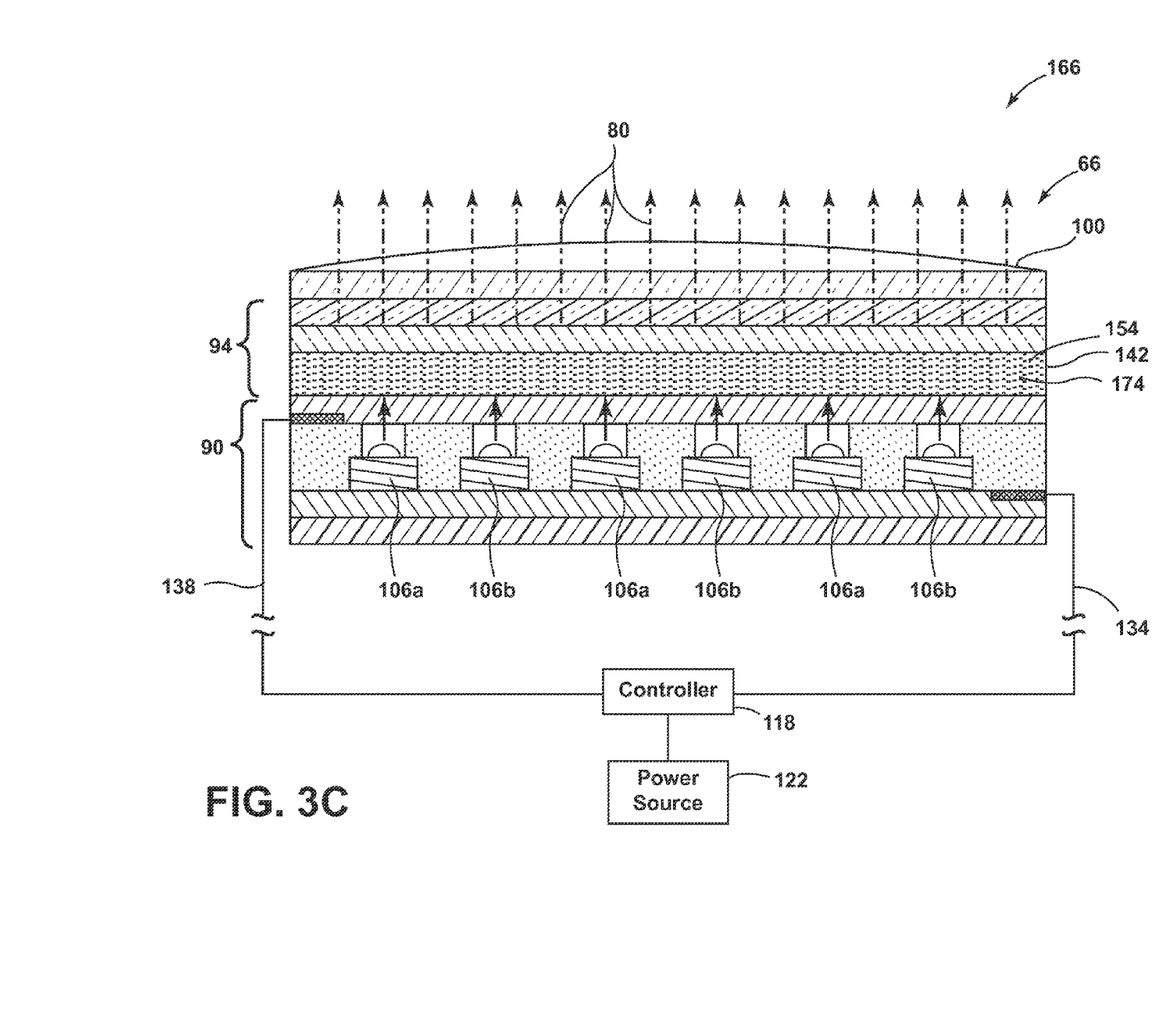
FIG. 3C is a cross-sectional view taken along line III-III of FIG. 2B further illustrating an energy conversion process for generating one or more colors, according to one embodiment.

Referring to FIGS. 3A-3C, a cross-sectional view of the light source 66 capable of use on a vehicle with an external photoluminescent material is shown according to one embodiment. As illustrated in FIG. 3A, the light source 66 may have a stacked arrangement that includes a light-producing assembly 90, a photoluminescent structure 94, and a viewable portion 100.

The light-producing assembly 90 may correspond to a thin-film or printed light emitting diode (LED) assembly and may include a substrate 98 as its lowermost layer. The substrate 98 may include a polycarbonate, poly-methyl methacrylate (PMMA), or polyethylene terephthalate (PET) material on the order of 0.005 to 0.060 inches thick and is arranged over the intended vehicle surface on which the light source 66 is to be received (e.g., recessed surface 62 or tailgate 34). Alternatively, as a cost saving measure, the substrate 98 may directly correspond to a preexisting vehicle structure (e.g., recessed surface 62, exterior panels and/or interior panels).

The light-producing assembly 90 includes a positive electrode 102 arranged over the substrate 98. The positive electrode 102 includes a conductive epoxy such as, but not limited to, a silver-containing or copper-containing epoxy. The positive electrode 102 is electrically connected to at least a portion of a plurality of LED sources 106 arranged within a semiconductor ink 110 and applied over the positive electrode 102. Likewise, a negative electrode 114 is also electrically connected to at least a portion of the LED sources 106. The negative electrode 114 is arranged over the semiconductor ink 110 and includes a transparent or translucent conductive material such as, but not limited to, indium tin oxide. Additionally, each of the positive and negative electrodes 102, 114 are electrically connected to a controller 118 and a power source 122 via a corresponding bus bar 126, 130 and conductive leads 134, 138. The bus bars 126, 130 may be printed along opposite edges of the positive and negative electrodes 102, 114 and the points of connection between the bus bars 126, 130 and the conductive leads 134, 138 may be at opposite corners of each bus bar 126, 130 to promote uniform current distribution along the bus bars 126, 130.

The LED sources 106 may be dispersed in a random or controlled fashion within the semiconductor ink 110 and may be configured to emit focused or non-focused light toward the photoluminescent structure 94. The LED sources 106 may correspond to micro-LEDs of gallium nitride elements on the order of about 5 to about 400 microns in size and the semiconductor ink 110 may include various binders and dielectric material including, but not limited to, one or more of gallium, indium, silicon carbide, phosphorous, and/or translucent polymeric binders. In this manner, the semiconductor ink 110 may contain various concentrations of LED sources 106 such that the density of the LED sources 106, or number of LED sources 106 per unit area, may be adjusted for various lighting applications. In some embodiments, the density of LED sources 106 may vary across the length of the light source 66. For example, a central portion of the light producing assembly 90 (e.g., proximate the license plate area 46) may have a greater density of LED sources 106 than peripheral portions. In such an embodiment, the light source 66 may appear brighter or have a greater luminance in order to preferentially illuminate the license plate area 46, license plate 50, or trailer hitch 58. In other embodiments, the density of LED sources 106 may increase or decrease with increasing distance from a preselected point. In some embodiments, the LED sources 106 and semiconductor ink 110 may be sourced from Nth Degree Technologies Worldwide Inc. The semiconductor ink 110 can be applied through various printing processes, including ink jet and silk screen processes to selected portion(s) of the positive electrode 102. More specifically, it is envisioned that the LED sources 106 are dispersed within the semiconductor ink 110, and shaped and sized such that a substantial quantity of them align with the positive and negative electrodes 102, 114 during deposition of the semiconductor ink 110. The portion of the LED sources 106 that ultimately are electrically connected to the positive and negative electrodes 102, 114 may be illuminated by a combination of the bus bars 126, 130, controller 118, power source 122, and conductive leads 134, 138. According to one embodiment, the power source 122 may correspond to a vehicular power source operating at 12 to 16 VDC. Additional information regarding the construction of light-producing assemblies is disclosed in U.S. Patent Publication No. 2014/0264396 A1 to Lowenthal et al., entitled "ULTRA-THIN PRINTED LED LAYER REMOVED FROM SUBSTRATE," filed Mar. 12, 2014, the entire disclosure of which is incorporated herein by reference.

Referring still to FIG. 3A, the photoluminescent structure 94 is arranged over the negative electrode 114 as a coating, layer, film or other suitable deposition. With respect to the presently illustrated embodiment, the photoluminescent structure 94 may be arranged as a multi-layered structure including an energy conversion layer 142, an optional stability layer 146, and an optional protection layer 150.

The energy conversion layer 142 includes at least one photoluminescent material 154 having energy converting elements with phosphorescent or fluorescent properties. For example, the photoluminescent material 154 may include organic or inorganic fluorescent dyes including rylenes, xanthenes, porphyrins, phthalocyanines. Additionally or alternatively, the photoluminescent material 154 may include phosphors from the group of Ce-doped garnets such as YAG:Ce. The energy conversion layer 142 may be prepared by dispersing the photoluminescent material 154 in a polymer matrix to form a homogenous mixture using a variety of methods. Such methods may include preparing the energy conversion layer 142 from a formulation in a liquid carrier medium and coating the energy conversion layer 142 to the negative electrode 114 or other desired substrate. The energy conversion layer 142 may be applied to the negative electrode 114 by painting, screen printing, flexography, spraying, slot coating, dip coating, roller coating, and bar coating. Alternatively, the energy conversion layer 142 may be prepared by methods that do not use a liquid carrier medium. For example, the energy conversion layer 142 may be rendered by dispersing the photoluminescent material 154 into a solid state solution (homogenous mixture in a dry state) that may be incorporated in a polymer matrix formed by extrusion, injection molding, compression molding, calendaring, thermoforming, etc.

To protect the photoluminescent material 154 contained within the energy conversion layer 142 from photolytic and thermal degradation, the photoluminescent structure 94 may include the stability layer 146. The stability layer 146 may be configured as a separate layer optically coupled and adhered to the energy conversion layer 142 or otherwise integrated therewith. The photoluminescent structure 94 may also include the protection layer 150 optically coupled and adhered to the stability layer 146 or other layer (e.g. the energy conversion layer 142 in the absence of the stability layer 146) to protect the photoluminescent structure 94 from physical and chemical damage arising from environmental exposure. The stability layer 146 and/or the protection layer 150 may be combined with the energy conversion layer 142 through sequential coating or printing of each layer, sequential lamination or embossing, or any other suitable means. Additional information regarding the construction of photoluminescent structures is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference.

In operation, the photoluminescent material 154 is formulated to become excited upon receiving inputted light of a specific wavelength from at least a portion of the LED sources 106 of the light-producing assembly 90. As a result, the inputted light undergoes an energy conversion process and is re-emitted at a different wavelength. According to one embodiment, the photoluminescent material 154 may be formulated to convert inputted light into a longer wavelength light, otherwise known as down conversion. Alternatively, the photoluminescent material 154 may be formulated to convert inputted light into a shorter wavelength light, otherwise known as up conversion. Under either approach, light converted by the photoluminescent material 154 may be immediately outputted from the photoluminescent structure 94 or otherwise used in an energy cascade, wherein the converted light serves as inputted light to excite another formulation of photoluminescent material located within the energy conversion layer 142, whereby the subsequent converted light may then be outputted from the photoluminescent structure 94 or used as inputted light, and so on. With respect to the energy conversion processes described herein, the difference in wavelength between the inputted light and the converted light is known as the Stokes shift and serves as the principle driving mechanism for an energy conversion process corresponding to a change in wavelength of light.

With continued reference to FIG. 3A, the viewable portion 100 is arranged over the photoluminescent structure 94. In some embodiments, the viewable portion 100 may include a plastic, silicon, or urethane material and is molded over the photoluminescent structure 94 and light-producing assembly 90. Additionally, the viewable portion 100, stability layer 146, and/or the protection layer 150 may extend around sides of the light producing assembly 90 to prevent penetration of moisture and/or contaminants into the light producing assembly 90. Preferably, the viewable portion 100 should be at least partially light transmissible in regards to converted light outputted from the photoluminescent structure 94. In this manner, the viewable portion 100 will be illuminated by the photoluminescent structure 94 whenever an energy conversion process is underway. Additionally, by over-molding the viewable portion 100, it may also function to protect the photoluminescent structure 94 and the light-producing assembly 90. The viewable portion 100 may be arranged in a planar shape and/or an arcuate shape to enhance its viewing potential when in a luminescent state. Like the photoluminescent structure 94 and the light-producing assembly 90, the viewable portion 100 may also benefit from a thin design, thereby helping to fit the light source 66 into small package spaces of the vehicle 10 (e.g., between the recessed surface 62 and the tailgate 34 and the rear surface 70 of the truck bed 18).

In some embodiments, a decorative layer 158 may be disposed between the viewable portion 100 and the photoluminescent structure 94. The decorative layer 158 may include a polymeric material or other suitable material and is configured to control or modify an appearance of the viewable portion 100 of the light source 66. For example, the decorative layer 158 may be configured to confer a metallic appearance to the viewable portion 100 when the viewable portion 100 is in an unilluminated state. In other embodiments, the decorative layer 158 may be tinted any color to complement the vehicle structure on which the light source 66 is to be received. In any event, the decorative layer 158 should be at least partially light transmissible such that the photoluminescent structure 94 is not prevented from illuminating the viewable portion 100 whenever an energy conversion process is underway.

In some embodiments, the photoluminescent structure 94 may be employed separate and away from the light producing assembly 90. For example, the photoluminescent structure 94 may be positioned on a vehicle component or surface proximate, but not in physical contact, with the light producing assembly 90. For example, the optically interactive portions 74, 78 may include the photoluminescent structure 94 in connection with above noted embodiments where the optically interactive portions 74, 78 include photoluminescent materials. It should be understood that in embodiments where the photoluminescent structure 94 is incorporated into the optically interactive portions 74, 78, the light source 66 may still have the same or similar structure to photoluminescent structure 94 as part of the light source 66.

Referring to FIG. 3B, an energy conversion process 162 for producing single color luminescence is illustrated according to one embodiment. For purposes of illustration, the energy conversion process 162 is described below using the light source 66 depicted in FIG. 3A. In this embodiment, the energy conversion layer 142 of the photoluminescent structure 94 includes only photoluminescent material 154, which is configured to convert inputted light (e.g., solid arrows) received from LED sources 106 into a visible light (e.g., broken arrows) having a wavelength different than that associated with the inputted light. More specifically, the photoluminescent material 154 is formulated to have an absorption spectrum that includes the emission wavelength of the inputted light supplied from the LED sources 106. The photoluminescent material 154 is also formulated to have a Stokes shift resulting in the converted visible light having an emission spectrum expressed in a desired color, which may vary per lighting application. The converted visible light is outputted from the light source 66 via the viewable portion 100, thereby causing the viewable portion 100 to illuminate in the desired color. In one embodiment, the energy conversion process 162 is undertaken by way of down conversion, whereby the inputted light includes light on the lower end of the visibility spectrum such as blue, violet, or ultraviolet (UV) light. Doing so enables blue, violet, or UV LEDs to be used as the LED sources 106, which may offer a relative cost advantage over simply using LEDs of the desired color and foregoing the energy conversion process altogether. Furthermore, the illumination provided by the viewable portion 100 offers a unique and attractive viewing experience that may be difficult to duplicate through non-photoluminescent means.

Referring to FIG. 3C, a second energy conversion process 166 for generating multiple colors of light is illustrated according to one embodiment. For consistency, the second energy conversion process 166 is also described below using the light source 66 depicted in FIG. 3A. In this embodiment, the energy conversion layer 142 includes the first and a second photoluminescent materials 154, 174 that are interspersed within the energy conversion layer 142. Alternatively, the photoluminescent materials 154, 174 may be isolated from each other if desired. Also, it should be appreciated that the energy conversion layer 142 may include more than two different photoluminescent materials, in which case, the teachings provided below similarly apply. In one embodiment, the second energy conversion process 166 occurs by way of down conversion using blue, violet, and/or UV light as the source of excitation.

With respect to the presently illustrated embodiment, the excitation of photoluminescent materials 154 and 174 are mutually exclusive. That is, photoluminescent materials 154 and 174 are formulated to have non-overlapping absorption spectrums and Stoke shifts that yield different emission spectrums. Also, in formulating the photoluminescent materials 154, 174, care should be taken in choosing the associated Stoke shifts such that the converted light emitted from one of the photoluminescent materials 154, 174 does not excite the other, unless so desired. According to one exemplary embodiment, a first portion of the LED sources 106, exemplarily shown as LED sources 106a, is configured to emit an inputted light having an emission wavelength that only excites photoluminescent material 154 and results in the inputted light being converted into a visible light of a first color (e.g., white). Likewise, a second portion of the LED sources 106, exemplarily shown as LED sources 106b, is configured to emit an inputted light having an emission wavelength that only excites second photoluminescent material 174 and results in the inputted light being converted into a visible light of a second color (e.g., red). Preferably, the first and second colors are visually distinguishable from one another. In this manner, LED sources 106a and 106b may be selectively activated using the controller 118 to cause the photoluminescent structure 94 to luminesce in a variety of colors. For example, the controller 118 may activate only LED sources 106a to exclusively excite photoluminescent material 154, resulting in the viewable portion 100 illuminating in the first color. Alternatively, the controller 118 may activate only LED sources 106b to exclusively excite the second photoluminescent material 174, resulting in the viewable portion 100 illuminating in the second color. Alternatively still, the controller 118 may activate LED sources 106*a* and 106*b* in concert, which causes both of the photoluminescent materials 154, 174 to become excited, resulting in the viewable portion 100 illuminating in a third color, which is a color mixture of the first and second color (e.g., pinkish). For energy conversion layers containing more than two distinct photoluminescent materials, a greater diversity of colors may be achieved. Contemplated colors include red, green, blue, and combinations thereof, including white, all of which may be achieved by selecting the appropriate photoluminescent materials and correctly manipulating their corresponding LED sources.

Figure 4:
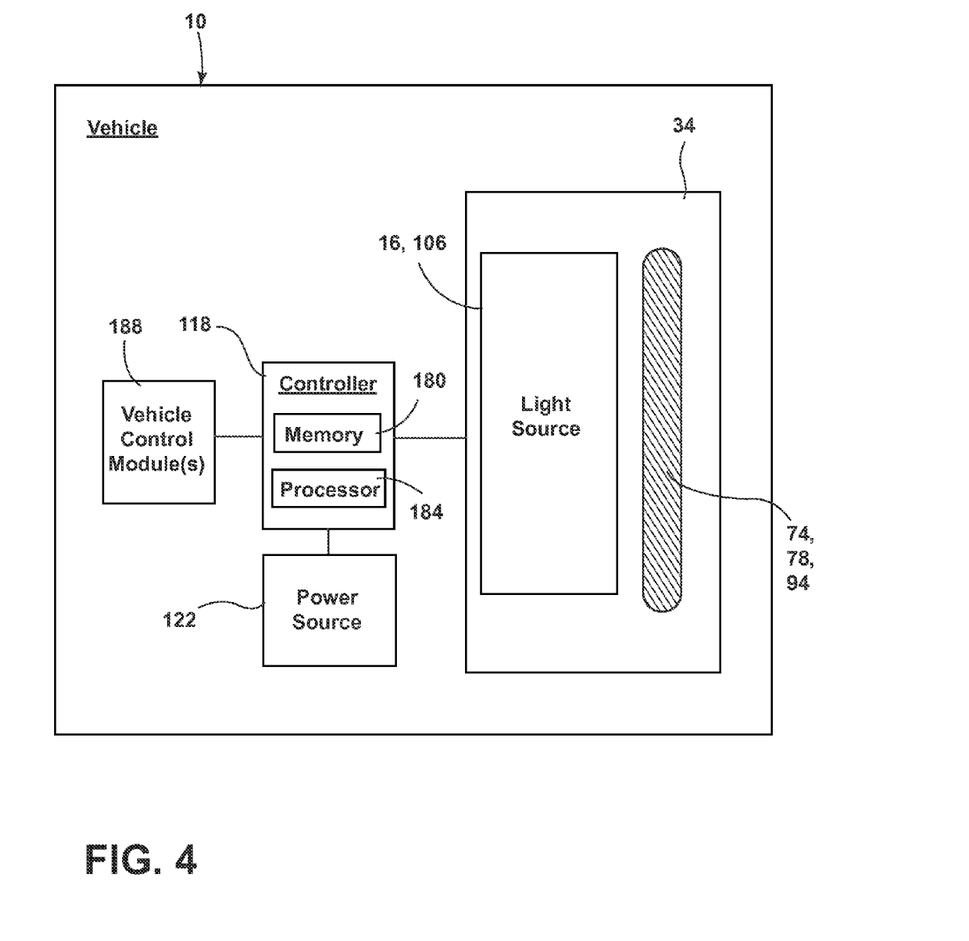
FIG. 4 is a block diagram illustrating the vehicle and tailgate illumination system.

Referring to FIG. 4, a box diagram of the vehicle 10 is shown in which an illuminated tailgate 34 is implemented. The tailgate 34 includes the controller 118 in communication with the light source 66. The controller 118 may include a memory 180 having instructions contained therein that are executed by a processor 184 of the controller 118. The controller 118 may provide electrical power to the light source 66, or to a respective bus bar (e.g., bus bars 126, 130), via the power source 122 located onboard the vehicle 10. In addition, the controller 118 may be configured to control the light output of the light source 66 based on feedback received from one or more vehicle control modules 188 such as, but not limited to, a body control module, engine control module, steering control module, brake control module, the like, or a combination thereof. By controlling the light output of the light source 66, the illuminated tailgate 34 may illuminate in a variety of colors and/or patterns to provide an aesthetic appearance, task lighting, or may provide vehicle information to an intended observer. For example, when the vehicle 10 is braking, the light source 66 may emit light 80 that is red to provide additional lighting. In another example, the light source 66 may emit light 80 having an amber color when the tailgate 34 is in the substantially open position to warn an occupant in the cargo space 30 of the gap 86. In yet other examples, the light source 66 may emit light having a white color to provide task lighting illumination to the cargo space 30 and proximate the trailer hitch 58. In other embodiments, the light source 66 may emit light having a white color to illuminate the license plate 50 while driving. In ground illumination embodiments, the emitted light 80 may take a variety of colors depending on the use of the light 80. For example, in task lighting circumstances, the emitted light may be white while in circumstances where the driver desires a ground effects look, the light 80 may be colored (e.g., green, red, blue, or combinations thereof).

In embodiments where the first or second optically interactive portions 74, 78 incorporate the photoluminescent structure 94, the controller 118 may prompt the light source 66 to emit a wavelength of light via the LED sources 106 to cause the photoluminescent material 154 of the light source 66 to illuminate in a first wavelength that stimulates the photoluminescent structure 94 of the first or second optically interactive portions 74, 78 into emitting a second wavelength. The first and second wavelengths may both be visible, resulting in a color mixture, or only one of the wavelengths may be visible resulting in a single color being produced. In additional embodiments, the controller 118 may modify the intensity of the wavelength of light from the LED sources 106 by pulse-width modulation or current control. In some embodiments, the controller 118 may be configured to adjust a color of the emitted light of the light source 66 by sending control signals to adjust an intensity or energy output level of the LED sources 106. For example, if the LED sources 106 are controlled to output the first emission at a low level, substantially all of the first emission may be converted to the second emission by the photoluminescent structure 94. Under this control scheme, the emitted light 80 may have a color corresponding to the second emission. If the LED sources 106 are controlled to output the first emission at a high level, only a portion of the first emission may be converted to the second emission. In this configuration, a color of light corresponding to mixture of the first emission and the second emission may be output as the emitted light 80. Under this control scheme, in embodiments where the first and second optically interactive portions 74, 78 contain photoluminescent materials, the first and/or second optically interactive portions 74, 78 may be excited by the first and/or second wavelengths.

It is also important to note that the construction and arrangement of the elements of the disclosure, as shown in the exemplary embodiments, are illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle, comprising:
   a truck bed defining a cargo space;
   a bumper positioned vehicle rearward of the truck bed;
   a tailgate defining a recessed surface, the tailgate rotatable between substantially open and substantially closed positions; and
   an illumination system comprising:
      a first optically interactive portion positioned on the truck bed;

a second optically interactive portion positioned on the tailgate; and a light source positioned on the recessed surface of the tailgate, wherein the light source and the first and second optically interactive surfaces are configured to illuminate the cargo space when the tailgate is in the substantially open position and illuminate the bumper in the substantially closed position.

2. The vehicle of claim 1, further comprising:

a trailer hitch mounted below the bumper, wherein the light source and the first and second optically interactive portions are configured to cooperatively illuminate the trailer hitch.

3. The vehicle of claim 1, wherein the first and second optically interactive portions include at least one of a photoluminescent portion and a reflective element.

4. The vehicle of claim 3, wherein the second optically interactive portion is a reflective element positioned to reflect light into the cargo space when the tailgate is in the substantially open position.

5. The vehicle of claim 3, wherein the first optically interactive portion comprises a photoluminescent material configured to emit light between the tailgate and the bumper.

6. The vehicle of claim 1, wherein the light source is a printed light emitting diode assembly having a variable density of light emitting diodes across a length of the printed light emitting diode assembly.

7. The vehicle of claim 6, wherein the light source has an increased density of light emitting diodes proximate a license plate area of the bumper.

8. A vehicle comprising:

a truck bed defining a cargo space;

a bumper positioned vehicle rearward of the truck bed;

a tailgate operable between a substantially open position and a substantially closed position; and an illumination system comprising a light source positioned on the tailgate such that the light source illuminates the bumper when the tailgate is in the closed position and illuminates the cargo space when the tailgate is in the open position.

9. The vehicle of claim 8, wherein the light source is positioned on the tailgate at about the same height or below a horizontal axis of rotation of the tailgate.

10. The vehicle of claim 8, further comprising:

a first optically interactive portion positioned on the truck bed and configured to illuminate between the tailgate and a bumper and a license plate area of the bumper; and a second optically interactive portion positioned on the tailgate and configured to illuminate the cargo space.

11. The vehicle of claim 10, wherein the second optically interactive portion is a reflective element configured to reflect light.

12. The vehicle of claim 8, wherein the light source is a printed light emitting diode assembly having a variable density of light emitting diodes across a length of the printed light emitting diode assembly.

13. The vehicle of claim 12, wherein the light source has an increased density of light emitting diodes proximate a license plate area.

14. A vehicle comprising:

a truck bed, defining a cargo space and having an optically interactive portion positioned thereon;

a bumper positioned vehicle rearward of the truck bed, the bumper defining a license plate area;

a trailer hitch mounted below the bumper; and a light source positioned on a tailgate which is operable between a substantially open position and a substantially closed position, wherein the optically interactive portion and light source are configured to cooperatively illuminate the cargo space when the tailgate is in the open position and illuminate the license plate area of the bumper and the trailer hitch in the closed position.

15. The vehicle of claim 14, wherein the optically interactive portion includes at least one of a photoluminescent portion and a reflective element.

16. The vehicle of claim 14, wherein the light source is a printed light emitting diode assembly having a variable density of light emitting diodes across a length of the printed light emitting diode assembly.

17. The vehicle of claim 16, wherein the light source has a greater density of light emitting diodes proximate a license plate area of the bumper.

18. The vehicle of claim 17, wherein a second reflective element is disposed on the tailgate and configured to reflect light into the truck bed when the tailgate is in the substantially horizontal position.

19. The vehicle of claim 18, wherein a second optically interactive portion which is reflective is disposed on the tailgate proximate the light source.

* * * * *

UNITED STATES PATENT AND TRADEMARK OFFICE
CERTIFICATE OF CORRECTION

Page 1 of 1

PATENT NO.       : 9,809,160 B2
APPLICATION NO.  : 14/687972
DATED            : November 7, 2017
INVENTOR(S)      : Salter et al.

It is certified that error appears in the above-identified patent and that said Letters Patent is hereby corrected as shown below:

In the Claims

Column 12:
Claim 14, Line 19;
"truck bed," should be --truck bed--.
Claim 18, Line 42;
"horizontal" should be --closed--.

Signed and Sealed this
Thirtieth Day of January, 2018

Joseph Matal
*Performing the Functions and Duties of the
Under Secretary of Commerce for Intellectual Property and
Director of the United States Patent and Trademark Office*